Dec. 13, 1949  R. B. HOFFMAN  2,490,808
RADIO DETECTION SYSTEM
Filed Nov. 28, 1942  2 Sheets-Sheet 1
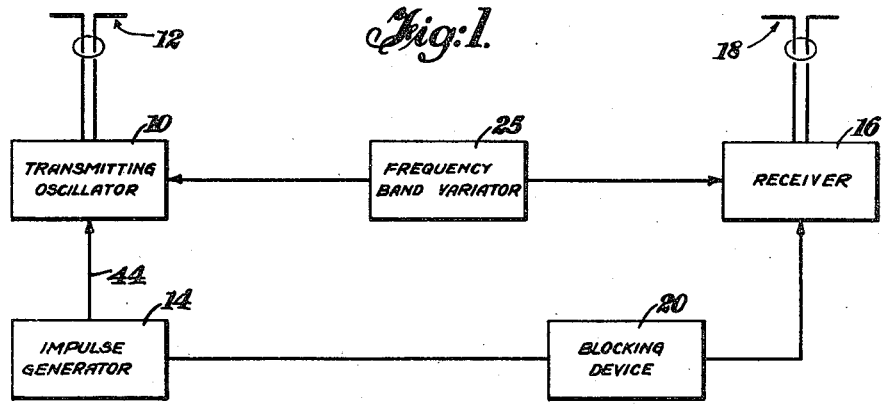
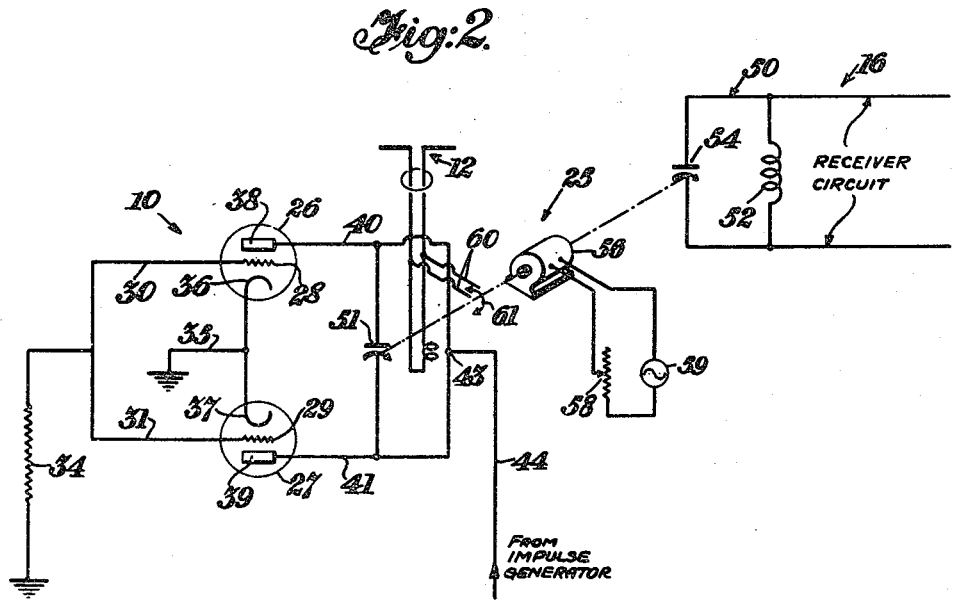
INVENTOR.
ROSS B. HOFFMAN
BY
ATTORNEY

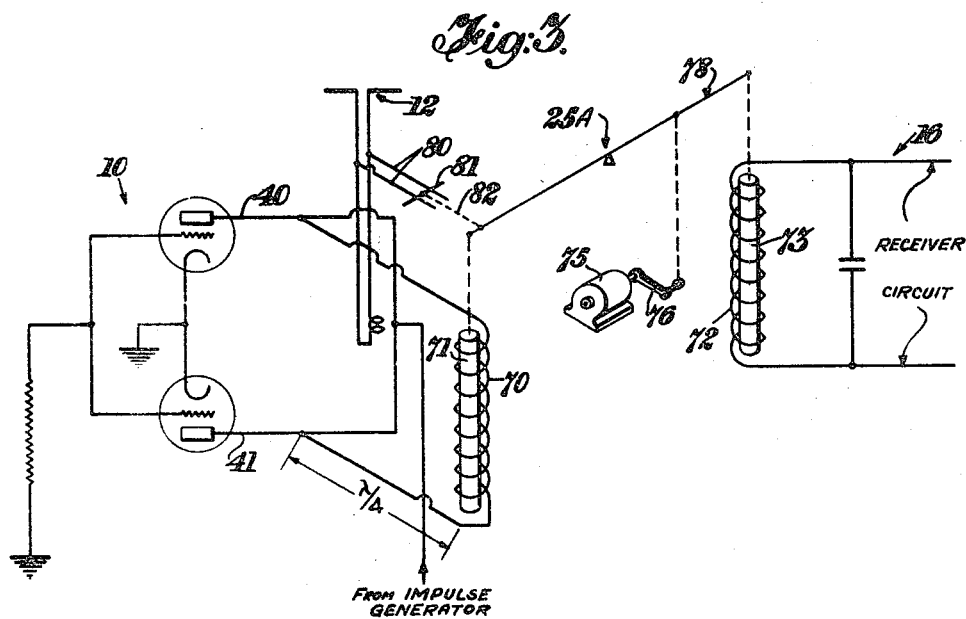
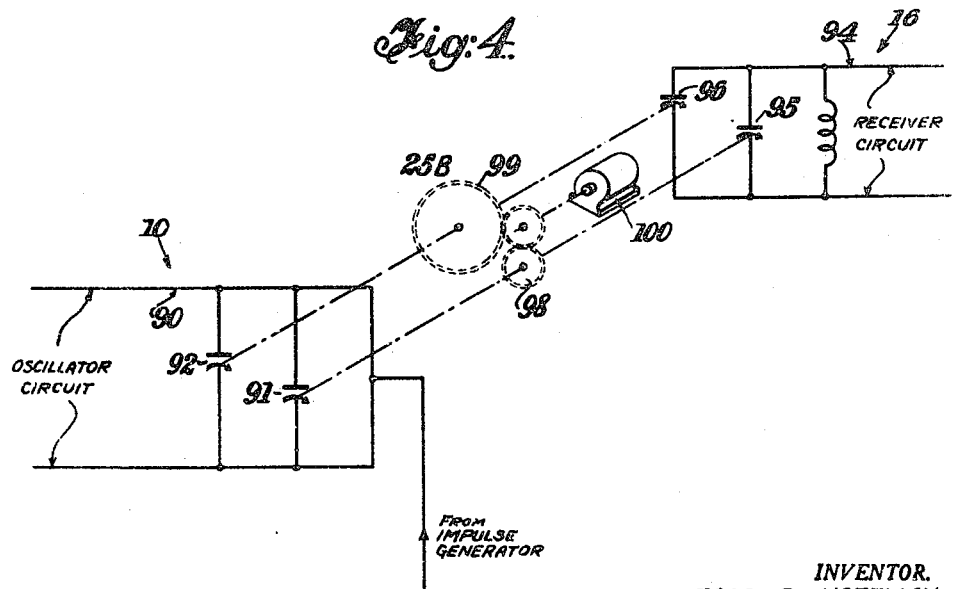

Patented Dec. 13, 1949

2,490,808

UNITED STATES PATENT OFFICE 2,490,808

RADIO DETECTION SYSTEM

Ross B. Hoffman, East Orange, N. J., assignor to Federal Telephone and Radio Corporation, Newark, N. J., a corporation of Delaware Application November 28, 1942, Serial No. 467,192

14 Claims. (Cl. 343—5)

This invention relates to radio obstacle detecting systems.

One of the objects of the invention is to provide a method and means for preventing or at least greatly minimizing the possibilities of an enemy jamming the operation of a radio detecting system and/or locating the site thereof, thus enabling continuous operation of the system with a high degree of safety from enemy detection and interference.

It is another object of the invention to provide a method and means to effect radio obstacle detection wherein the transmission of impulses is difficult for an enemy to detect.

Another object of this invention is to provide a method and means to effect radio obstacle detection of such character that even should an enemy detect the transmission of impulses, it will be difficult for him to determine the frequency of transmission or to jam the transmission.

In accordance with this invention, the possibility of an enemy detecting the impulse transmission of a radio obstacle detection system, determining the operating or carrier frequency of impulse transmission and/or jamming the operation thereof, are greatly minimized, if not entirely prevented. This I accomplish by continuously cyclically varying, preferably over a wide range, the operating frequency of the transmitter and receiver of the system. For example, the operating frequency may be varied over a given frequency band at a rate such as 8 or 9 cycles of operation per second unsynchronized with the rate of impulse generation which may be at the rate of 60 impulses per second. If desired, two or more variations may be effected simultaneously. For example, the frequency may be varied over a given band and this band be varied over a second band and at a different rate. Such a complex frequency variation, even if impulse transmission were detected, would be exceedingly difficult to determine.

Even where a simple form of variation of the operating frequency is effected, detection and determination of the frequency of transmission is difficult by usual receiving devices. For example, should the operating frequency be varied 20 megacycles with respect to a carrier midband of say, 220 megacycles, at a rate of 10 cycles per second, such variation not being in synchronism with the impulse transmission, a receiver with one megacycle band would receive only about one and one-half impulses per second as an average. This width would decrease with narrower band receivers.

While this variation of operating frequency tends to alter the radiation pattern of the transmitter, this alteration of the radiation pattern may be substantially avoided by providing the antenna with an adjustable network and varying the adjustment thereof in accordance with the variation of the operating frequency of the transmitter. It will be understood, however, that even without this variation of the impedance, the obstacle detection apparatus in accordance with this invention will operate successfully except that the directivity thereof will be diminished. The disadvantage of this decrease in directivity may be overcome by other methods such as by using separate directive equipment. When an obstacle such as a ship or aircraft has been detected and is within range, the variation of the operating frequency may be discontinued for short intervals to improve directivity of the apparatus without materially increasing the chance of the enemy detecting the position of the radio detection apparatus.

For a better understanding of the method and of forms of apparatus by which the method may be practiced, reference may be had to the following detailed description to be read in connection with the accompanying drawings, in which Fig. 1 is a block diagram of a radio obstacle detection system in accordance with this invention; and Figs. 2, 3 and 4 are schematic illustrations of parts of the transmitter and receiver circuits of the system illustrating various forms of frequency variator means by which the methods can be practiced.

Referring to Fig. 1, of the drawings, a radio obstacle detection system is shown in accordance with this invention to comprise a transmitting oscillator 10 having an antenna 12 and an impulse generator 14 associated therewith by which impulses can be transmitted. A receiver 16 is associated with the transmitting oscillator 10 and has an antenna 18 by which it receives echo pulses caused by obstacles in response to the transmission of impulses from the antenna 12. Operation of the receiver 16 is blocked during the transmission of the impulses by a known blocking device 20 controlled by the impulse generator 14. For a more complete understanding of radio detection systems reference is made to the disclosures contained in the copending applications of H. Busignies, Serial No. 381,640 filed March 4, 1941, and in the patent to E. Labin, Patent No. 2,408,076 dated September 24, 1946.

In accordance with my invention, I provide a frequency band variator 25 to control the operating frequency of the oscillator 10 and the receiver 16. As shown more particularly in Fig. 2, one form of obstacle detector apparatus includes an oscillator containing two tubes 26 and 27 arranged in push-pull with the grids 28 and 29 thereof connected to a pair of Lecher wires 30 and 31 which serve to tune the grid circuits of the tubes. A resistor 34 serves as a biasing resistor for the grids. The cathodes 36 and 37 are connected to a common ground return point 35. The plates 38 and 39 are connected to Lecher wires 40 and 41 and the mid-point 43 of the Lecher wires is connected to the output 44 of the impulse generator 14.

When the impulse generator discharges, the tubes 26 and 27 and their accompanying circuits are energized and oscillations are produced. For the purpose of varying the frequency band at which the oscillator 10 operates, I connect across Lecher wires 40 and 41 a variable condenser 51. The oscillator is shown directly coupled to the antenna system 12, but it may also be coupled to an amplifier and then to the antenna system if desired. It will also be understood that while I have shown a push-pull oscillator, other types of oscillators may be employed.

For brevity of illustration, only a fragmentary part of the receiver 16, that is, the tuning circuit portion 50 is shown. This circuit portion includes a variable condenser 54 and an inductance 52 by which the frequency band of the receiver can be varied.

To simultaneously and continuously vary the tuning of the plate circuit of the oscillator 10 and the circuit 50 of the receiver, I provide a motor 56 connected to the condensers 51 and 54. The motor 56 may be controlled by a rheostat 58 connected to a source of current 59. The motor 56 may be driven at any desired rate to vary the tuning of the oscillator and the receiver. The condensers 51 and 54 are so chosen as to withstand high voltages and to vary the tuning of the respective circuits over a given band such as 40 megacycles, more or less, as desired. This wide variation of the operating frequency of the obstacle detection apparatus is as hereinbefore stated difficult to determine even when transmission of the apparatus is detected.

In order to vary the impedance looking into the antenna 12 in accordance with the variation of the operating frequency of the oscillator 10, I provide an impedance adjusting network 60 and dispose between the parts thereof a condenser plate or the like 61 which when revolved with the rotatable condenser plates of the condensers 51 and 54, will effect a variation of the impedance of the antenna system in accordance with variation of the operating frequency. In this way, the radiation pattern of the antenna system is maintained substantially constant so that directivity of the apparatus is assured for all portions of the band over which the operating frequency is varied.

In Fig. 3, I have shown a modified form of frequency band variator 25A in which the oscillator 10 is provided with an inductance coil 70 in the place of the condenser 51 shown in Fig. 2. The inductance coil 70 is connected to the wires 40 and 41 through a quarter wavelength line. This form may be preferable to the form shown in Fig. 2 where very high voltages occur in the plate circuit of the oscillator.

In order to effect a like variation in frequency in the tuning circuit of the receiver 16, the circuit thereof is provided with an inductance coil 72 similar to the inductance coil 70. These inductances are provided with impedance varying pistons 71 and 73, respectively. A motor 75 is provided with a crank arm 76 and a link mechanism 78 connected to the pistons 71 and 73 to effect simultaneous variation of the impedances of the coils 70 and 72.

If a rotary movement is desired in preference to a reciprocating movement, a suitably shaped disc or slug may be located in the coils and revolved.

The antenna system 12 may be provided with a network 80 similar to the network 60 shown in Fig. 2, for control by the motor 75. I have shown in the network 80 a short circuiting bar 81 adjustable lengthwise therealong instead of the rotating element 61 of Fig. 2. This bar is connected by a link 82 to the link mechanism 78 so that the impedance of the antenna system is varied in accordance with the variation in the operating frequency of the oscillator. The pistons 71 and 73 may comprise any suitable material such as copper, aluminum, iron composition, etc. whereby variation in their positions will vary the impedance of the coil.

In Fig. 4 I have shown still another form of frequency band variator 25B whereby a complex frequency variation is effected. The plate circuit 90 of the oscillator 10 is provided with a first condenser 91 and a second condenser 92 connected in parallel thereacross. The tuning circuit 94 of the receiver 16 is likewise provided with first and second condensers 95 and 96 connected in parallel thereacross. The first condensers 91 and 95 are driven at a given rate such as 9 or 10 revolutions per second by driving element 98 driven by a motor 100. The second condensers 92 and 96 are driven by a driving element 99 from the same motor. The driving elements 98 and 99 may be of any selected driving ratio so that the first condensers 91 and 95, for example, are driven at a higher rate than the condensers 92 and 96. This double variation of tuning provides a wide variation of complex frequency variations which can be used and which are obviously exceedingly difficult for the enemy to determine even when he has a wide band receiver.

It will be understood that the condensers 91, 92, 95 and 96 may be replaced by forms of variable inductances such as hereinbefore disclosed or by other forms of tuning equipment. It will also be understood that driving movements of the elements 98 and 99 may be integrated and applied to the adjustable network of the antenna system 12 similarly as illustrated in Fig. 3.

While I have described above the principles of my invention in connection with specific apparatus, and particular modifications thereof, it is to be clearly understood that this description is made only by way of example and not as a limitation on the scope of my invention as set forth in the objects of my invention and the accompanying claims.

What I claim is:

1. A method of operating obstacle detection apparatus having a transmitter to transmit impulses and a receiver to detect echo pulses caused by obstacles in response to said impulses, comprising continuously cyclically varying the frequency of operation of the transmitter over a wave band of predetermined width, correspondingly continuously cyclically varying the operating frequency of the receiver, the number of impulses transmitted being greater than the number of said cycles of frequency variation for a given unit of time, and blocking the receiver during transmission of impulses.

2. A method of operating obstacle detection apparatus having a transmitter operable to directively transmit impulses over an antenna and a receiver to detect echo pulses caused by obstacles in response to said impulses comprising continuously varying the operating frequency of the transmitter and receiver independently of said transmissions varying the impedance looking into the antenna in accordance with the variation of the operating frequency and blocking the receiver during transmission of impulses.

3. A radio obstacle detection system comprising means to transmit impulses, means to receive echo pulses caused by an obstacle in response to said impulses, control means for varying the tuning of the transmitting means independently of the impulse transmissions, control means for varying the tuning of the receiving means, variator means to continuously vary both said control means, and means for blocking said second named means during transmission of impulses, whereby direct reception of said transmitting means is substantially prevented.

4. The radio obstacle detection system defined in claim 3 wherein the variator means includes control means to vary the rate of frequency variation produced by the two control means.

5. A radio obstacle detection system comprising means including an oscillator for transmitting impulses, means including a receiver to indicate echo pulses caused by an obstacle in response to said impulses, said oscillator and said receiver each having a tunable tank circuit by which their operating frequency can be varied, the variator means to vary continuously through a given cycle of operation the tuning of the tank circuits of the oscillator and receiver to continuously change the operating frequency thereof, the number of impulses transmitted being greater than the number of said cycles of frequency variation for a given unit of time, and means for blocking said second named means during transmission of impulses, whereby direct reception of said transmitting means is substantially prevented.

6. The radio obstacle detection system defined in claim 5 wherein the tunable tank circuits each include a variable condenser and the variator means is arranged to control the operation of said condensers.

7. The radio obstacle detection system defined in claim 5 wherein the tunable tank circuits each includes an inductance having an impedance varying element associated therewith and the variator means includes means to control the movement of the elements.

8. The radio obstacle detection system defined in claim 5 wherein the tunable tank circuits each includes first and second tuning elements, and the variator means includes means to vary at a given rate the tuning of said first elements and means to vary the tuning of said second element at a rate different from said given rate.

9. The radio obstacle detection system defined in claim 5 wherein the tunable tank circuits each includes first and second condensers connected in parallel, and the variator means includes means to vary at a given rate the tuning of said first condensers and means to vary the tuning of said second condensers at a rate different from said given rate.

10. A radio obstacle detection system comprising means including an oscillator and an antenna for transmitting impulses, means including a receiver to indicate echo pulses caused by an obstacle in response to said impulses, said oscillator and said receiver each having a tunable tank circuit by which its operating frequency can be varied independently of the pulse transmissions, said antenna having an adjustable network by which the impedance looking into the antenna can be varied, variator means to vary continuously the tuning of the tank circuits of the oscillator and receiver and the adjustment of said network and means for blocking said second named means during transmission of impulses, whereby direct reception of said transmitting means is substantially prevented.

11. A radio obstacle detection system comprising means to transmit impulses, said transmitting means having an antenna including an adjustable network by which the impedance looking into the antenna can be varied, means to receive echo pulses caused by an obstacle in response to said impulses, variator means to continuously vary independently of the impulse transmission the frequency of both said impulse transmitting means and said echo pulse receiving means, said variator means having means to also vary the adjustment of the network in accordance with variation of the transmitting frequency and means for blocking said second named means during transmission of impulses, whereby direct reception of said means for transmitting is substantially prevented.

12. The method defined in claim 1 and comprising the further step of varying the carrier frequency of operation of the transmitter and receiver additionally to the first mentioned varying operation.

13. The radio obstacle detection system defined in claim 3 wherein said variator means comprises supplementary control means for varying the tuning of the transmitting means, and supplementary control means for varying the tuning of the receiving means.

14. The radio obstacle detection system defined in claim 3 wherein the variator means includes means to vary the frequency tuning over a given wave band and at a predetermined rate, said given wave band corresponding to the algebraic sum of a plurality of wave bands, and said predetermined rate corresponding to the algebraic sum of a plurality of different rates.

ROSS B. HOFFMAN.

REFERENCES CITED

The following references are of record in the file of this patent:

UNITED STATES PATENTS

| Number | Name | Date |
| --- | --- | --- |
| 1,607,485 | Schmidt | Nov. 16, 1926 |
| 2,011,392 | Bentley | Aug. 13, 1935 |
| 2,134,850 | Baesecke | Nov. 1, 1938 |
| 2,189,549 | Hershberger | Feb. 6, 1940 |
| 2,227,598 | Lyman et al. | Jan. 7, 1941 |
| 2,361,437 | Trevor | Oct. 31, 1944 |
| 2,395,928 | Willoughby | Mar. 5, 1946 |
| 2,407,644 | Benioff | Sept. 17, 1946 |

FOREIGN PATENTS

| Number | Country | Date |
| --- | --- | --- |
| 637,984 | France | Feb. 13, 1928 |